United States Patent Office 3,551,099
Patented Dec. 29, 1970

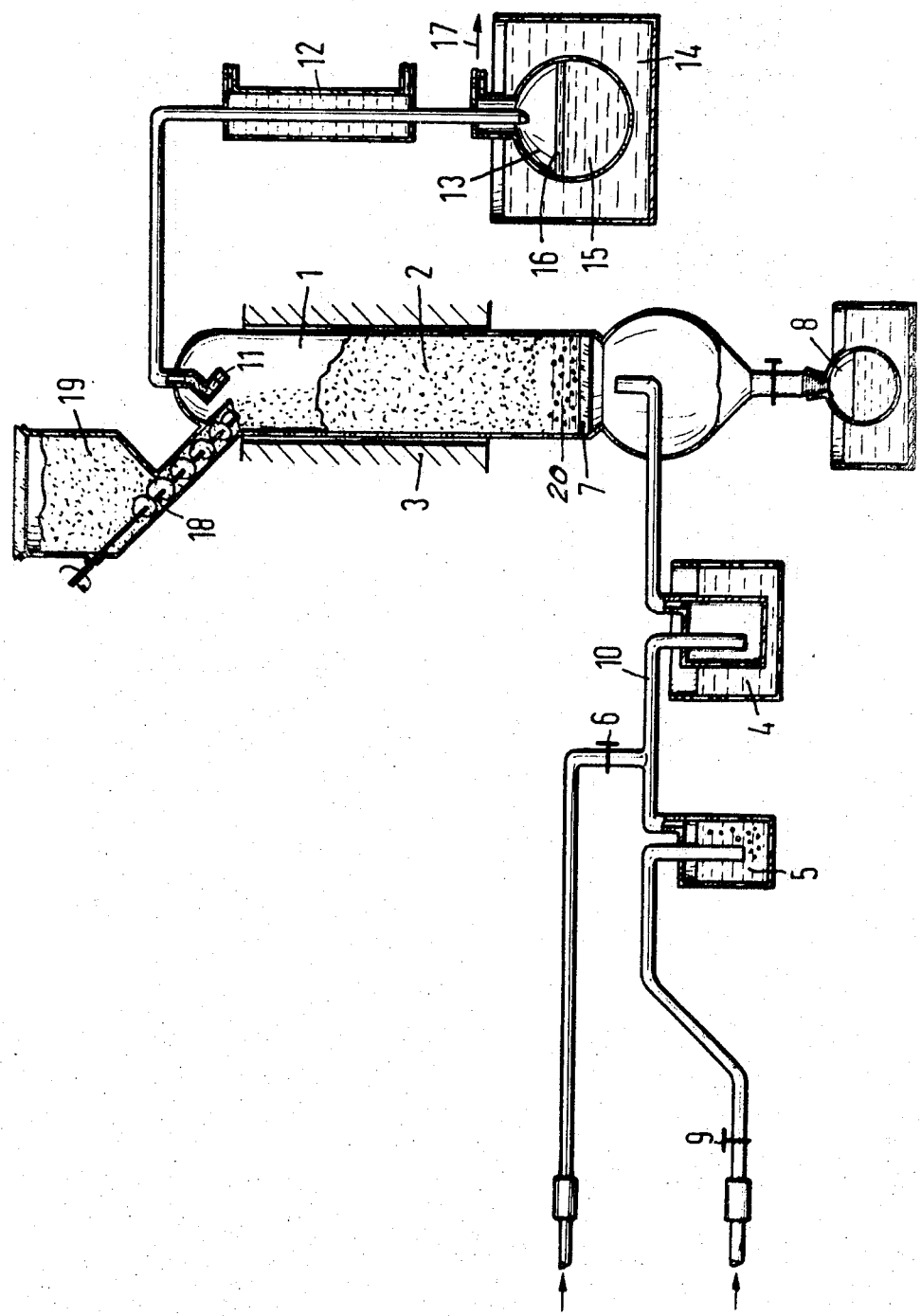

3,551,099
METHOD OF PRODUCING HIGHLY PURE ARSENIC TRICHLORIDE
Erhard Sirtl, Midland, Mich., and Josef Paulik, Munich, Germany, assignors to Siemens Aktiengesellschaft, a corporation of Germany
Filed Apr. 30, 1969, Ser. No. 821,553
Claims priority, application Germany, May 3, 1968, 1,767,372
Int. Cl. C01b 27/00
U.S. Cl. 23—98                                           8 Claims

ABSTRACT OF THE DISCLOSURE

Described is a process for producing highly purified arsenic trichloride, with a sulphur content smaller than 0.1 p.p.m. The process is characterized by passing highly pure, gaseous hydrogen chloride in the presence of elemental oxygen, through arsenic trioxide, heated in a reaction chamber. The gaseous arsenic trichloride, formed thereby, and the aqueous hydrochloric acid which contains the sulphur oxides as a distillate are received in a vessel, cooled below room temperature, so that a two-phase condensate, comprised of a solution of arsenic trichloride and aqueous hydrochloric acid, containing the sulphur oxides, forms in said receiving vessel and separating the two layers. The method is characterized in that arsenic trioxide is stacked in a reaction chamber, about a frit which is connected with a vessel serving as a preprecipitator. The reaction gas is supplied to the reaction chamber through the frit, whereby rinsing is effected with pure oxygen at the onset of reaction, whereafter gaseous hydrogen chloride is admixed. Additional arsenic trioxide is continuously supplied from a storage container to the reaction chamber, according to the progress of the reaction.

---

Described is a process for producing highly purified arsenic trichloride, with a sulphur content smaller than 0.1 p.p.m. The process is characterized by passing highly pure, gaseous hydrogen chloride in the presence of elemental oxygen, through arsenic trioxide, heated in a reaction chamber. The gaseous arsenic trichloride, formed thereby, and the aqueous hydrochloric acid which contains the sulphur oxides as a distillate are received in a vessel, cooled below room temperature, so that a two-phase condensate, comprised of a solution of arsenic trichloride and aqueous hydrochloric acid, containing the sulphur oxides, forms in said receiving vessel and separating the two layers.

It is an object of the present invention to increase still further the purity of the arsenic trichloride. Another object of our invention is to provide a continuous method for producing arsenic trichloride in greater amounts, with a higher throughput per time unit, without diminishing the purity of the product obtained.

The present invention solves these problems in a very elegant and simple manner and affords substantial improvements for producing arsenic trichloride, compared to the known methods.

To this end, our invention proposes to stack the arsenic trioxide in the reaction chamber above a frit, connected with a vessel which serves as a preprecipitator. The reaction gas is supplied to the reaction chamber via said frit, whereby rinsing is effected by means of pure oxygen at the onset of the reaction, whereafter gaseous hydrogen chloride is added. Additional arsenic trioxide is supplied continuously from a storage container to the reaction chamber, according to the reaction progress.

It is within the framework of our invention to adjust the ratio of the reaction gas mixture $HCl/O_2$ and its flow velocity in such a way so that the aqueous phase which also occurs as an end product, is collected in the preprecipitator due to the capillary action of the frit. Virtually pure arsenic trichloride is transferred into the collecting vessel. It is of importance in this respect, that a so-called "sump" formation of arsenic oxychloride above the frit, ensures a very intensive mixing of the reaction partners. The exothermal reaction of the arsenic oxides with the gaseous hydrogen chloride ensures a continuation of the reaction through the stacked mass. Moreover, the aqueous phase which forms during the reaction and which contains the impurities, particularly the $SO_2$, is gradually removed from the system by the frit as a result of capillary effects, before the $SO_2$ reaches the transferred condensate. This offers the great advantage, as compared to copending application Ser. No. 706,264 of Erhard Sirtl filed Feb. 19, 1968, one of the inventors of the present application, that the greater portion of the impurities, contained in the aqueous phase, are removed even during the reaction process. The ratio of aqueous phase content in the preprecipitator and in the condensate is determined by the flow velocity and by the partial pressure $P_{O_2}/P_{HCl}$.

According to a particularly preferred embodiment, the ratio of elemental oxygen:gaseous hydrogen chloride is adjusted, in the reaction gas, to approximately 1:3 and the linear flow velocity is fixed at approximately 5 cm./sec.

All apparatus parts, particularly the reaction vessel, are of quartz glass to ensure purity.

A further development of the inventive idea provides that the continuous supply of arsenic oxide from the storage container be effected via a spiral feed. When the arsenic oxide stack above the frit is high, it is advisable to use also vertically small diameter quartz tubes, above the frit, whereby the outlet opening is higher than the filling height.

It is expedient to heat the upper portion of the reaction chamber, additionally, to a maximum of 200° C., to avoid too strong a reflux of the volatile reaction product. It is especially preferable to place the vessel, which is arranged below the frit in the form of a preprecipitator, into a cooling bath preferably adjusted to 0° C.

The invention will now be described in greater detail by means of an embodiment example, with reference to the drawing.

In the drawing, 1 denotes a reaction chamber consisting of a vertical quartz vessel, which contains $As_2O_3$, in the form of powder, provided for chlorination. The quartz vessel 1 is enclosed on all sides by an adjustable furnace 3 which can heat the reaction chamber up to its top end, to a temperature of approximately 200° C. The bottom end of the reaction chamber 1 is sealed by a porous frit 7 that is connected with a vessel 8, serving as a preprecipitor. The vessel 8 is kept in a cooling or ice bath at 0° C. During the process, $As_2O_3$ which is contained in a storage container 19 is continually supplied with the aid of a worm drive 18 laterally installed at the upper end of the reaction chamber 1 to the reaction chamber 1. A blending chamber 4, connected ahead of the reaction chamber 1, has a cooling trap that is maintained, by a Dry Ice mixture, at −78° C. The reaction gas, which is preferably comprised at 75% hydrogen chloride gas and 25% elemental oxygen, controlled respectively by valves 6 and 9, is supplied through a common supply line 10 via the blending chamber 4 to the reaction chamber 1. To remove various impurities contained in the gaseous hydrogen chloride, a flask 5 with 50% perchloric acid is provided ahead of the blending chamber 4. Prior to the onset of the actual reaction, the reaction gas is rinsed with elemental oxygen. The reaction gas is then introduced, via the porous frit, into the reaction chamber 1, which is heated to about 200° C., wherein the reaction gas reacts with the $As_2O_3$ contained in said reaction chamber. First of all this forms a sump 20. By adding HCl through the frit 7 and sump 20, a very intensive blending of the reaction partners is ensured. The exothermal reaction of the arsenic trioxide with the hydrogen chloride also ensures a continuation of the reaction through the stacked mass. A further addition of $As_2O_3$ via the worm 18 is best effected only after the pure sump phase has been obtained in the reaction chamber 1. The aqueous phase, which is developed during the further course of the reaction and which contains the impurities, is continually or gradually removed from the system at the frit 7, by means of capillary effects and carried off to vessel 8, which serves as a preprecipitator and is located below the frit 7. The $AsCl_3$ which is present in a gaseous state and formed by the reaction in the reaction chamber 1, leaves the reaction chamber, sealed at its end with a quartz wool plug 11, together with the excess hydrogen chloride gas and a portion of the sulphuric oxides, freed by the elemental oxygen and reaches a collecting vessel 13, via a condenser 12, cooled by tap water. The cooler 12 is kept at a temperature of 0° C. in bath 14. The collecting vessel holds a two-phase condensate, comprised of a lower aqueous $AsCl_3$ solution 15 and an upper aqueous HCl solution 16 containing a portion of the sulphuric compounds from the $As_2O_2$, as well as other hydrophilic impurities dissolved therein. The remaining portion of the sulphuric compounds is in preprecipitator 8. The residual gases leave the apparatus at the arrow marked 17.

The $AsCl_3$ solution obtained in this manner is separated in a separatory funnel from the aqueous HCl solution and brought to a boil by a surface active moisture-laden $As_2O_3$ powder of appropriate purity, under reflux in a nitrogen current, to remove the remaining traces of $S_2Cl_2$ and for expelling the $SO_2$. The $AsCl_3$ solution is subsequently subjected to a fractional distillation in a column, whose separating effect corresponds to at least 20 theoretical plates. Care must be taken, thereby, that at least 20% of the total charge is separated, as a first run, since the arsenic trichloride phase still contains impurities with OH groups (hydroxychlorides) which dissociate at a progressing distillation, with a splitting out of water.

The arsenic trichloride thus obtained can be very easily converted into the elemental arsenic, by means of known reduction methods.

The arsenic trichloride produced according to the teaching of the present invention is particularly well suited, due to its high purity, for the preparation of gallium arsenide, more particularly for the production of thin, epitactic layers that are necessary for semiconductor components with high-frequency requirements. The arsenic trichloride, respectively the arsenic produced in accordance with the invention was found very suitable as the original material for other compound semiconductors.

We claim:

1. In the method of producing highly purified arsenic trichloride, with a sulphur content smaller than 0.1 p.p.m., which comprises passing highly pure, gaseous hydrogen chloride in the presence of elemental oxygen through arsenic trioxide with a sulphur impurity which is heated in a reaction chamber, formed by the reaction are gaseous arsenic trichloride, and aqueous hydrochloric acid which contains the sulphur oxides produced pass over as a distillate into a vessel, cooled below room temperature, to form a two-phase condensate, comprising as a first phase a solution of arsenic trichloride and as a second phase aqueous hydrochloric acid, containing the sulphur oxides, and separating the two phases, the improvement which comprises stacking the arsenic trioxide in a reaction chamber, above a frit which is connected with a vessel serving as a preprecipitator, supplying the reaction gas to the reaction chamber through the frit, whereby rinsing is effected with pure oxygen at the onset of reaction, thereafter admixing gaseous hydrogen chloride to the oxygen and continuously supplying additional arsenic trioxide from a storage container to the reaction chamber, according to the reaction progress.

2. The method of claim 1, wherein the ratio of the reaction gas mixture $HCl/O_2$, and its flow velocity can be so adjusted that, due to the capillary effect of the frit, the aqueous phase which also occurs as an end product, collects in the preprecipitator and virtually pure arsenic trichloride is transferred into the collecting vessel.

3. The method of claim 2, wherein the ratio of elemental oxygen:gaseous hydrogen chloride in the reaction gas, is set at about 1:3 and the linear flow velocity is adjusted to approximately 5 cm./sec.

4. The method of claim 3, wherein the container parts are manufactured out of quartz glass.

5. The method of claim 3, wherein the arsenic oxide is effected from the storage container, via a worm feed.

6. The method of claim 5, wherein the arsenic trichloride is removed at a height above the arsenic trioxide feed.

7. The process of claim 6, whereby the upper portion of the reaction chamber is additionally heated to a maximum of 200° C.

8. The process of claim 7, wherein the preprecipitator is cooled to 0° C.

References Cited

UNITED STATES PATENTS

| | | | |
|---|---|---|---|
| 1,512,734 | 10/1924 | Wescott | 23—98 |
| 1,525,480 | 2/1925 | Wescott | 23—98X |
| 1,852,183 | 4/1932 | Miller et al. | 23—98 |
| 2,383,105 | 8/1945 | Booth | 23—98 |
| 3,194,631 | 7/1965 | Cobel et al. | 23—98 |
| 3,359,071 | 12/1967 | Merkel et al. | 23—98 |

EDWARD STERN, Primary Examiner

U.S. Cl. X.R.

23—204, 209